F. J. FOOTE.
AIR BAG.
APPLICATION FILED MAY 10, 1917.
1,240,433.
Patented Sept. 18, 1917.
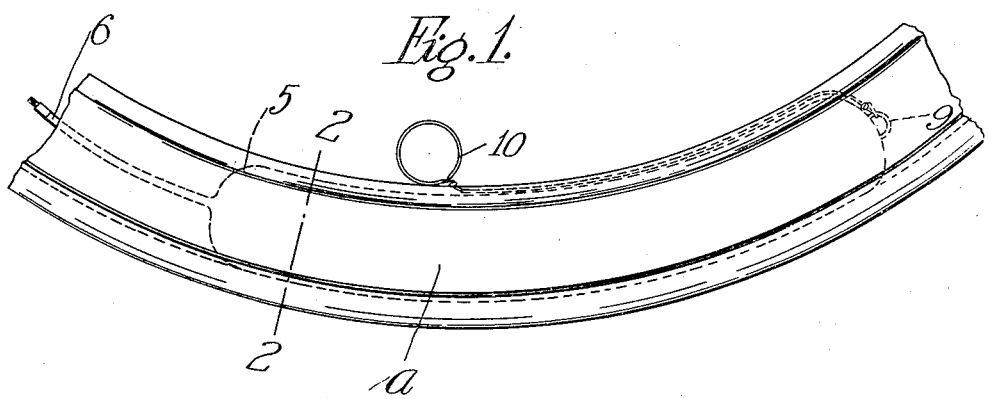
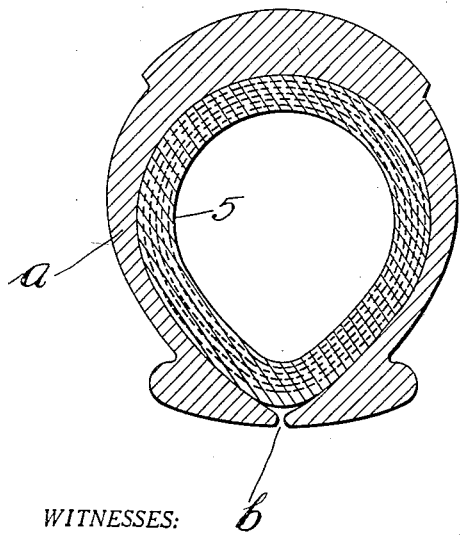
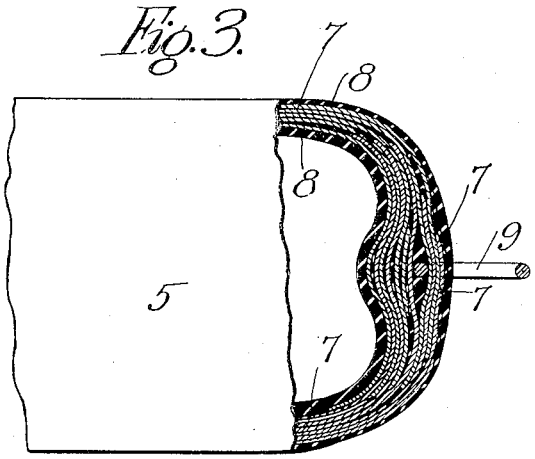
WITNESSES:
W. C. Ross
INVENTOR.
Frank J. Foote
BY Chapin & Neal
ATTORNEYS.

UNITED STATES PATENT OFFICE.

FRANK J. FOOTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

AIR-BAG.

1,240,433.      Specification of Letters Patent.      Patented Sept. 18, 1917.

Application filed May 10, 1917. Serial No. 167,721.

*To all whom it may concern:*

Be it known that I, FRANK J. FOOTE, a citizen of the United States of America, residing at Chicopee Falls, in the county of Hampden and State of Massachusetts, have invented certain new and useful Improvements in Air-Bags, of which the following is a specification.

This invention relates to improvements in air bags, such, for example, as are used in repairing and particularly in vulcanizing tire shoes.

Air bags of this type usually consist of a hollow receptacle of general cylindrical form and having closed ends. They are made much in the fashion of the tire shoe itself, being hard, tough, and strong, and, although they are inflatable, they are not collapsible when deflated. Such bags are used within a tire shoe in coöperation with vulcanizing molds on the exterior of the shoe, to force the shoe against the mold, and to accomplish this function they are inflated to high pressure. Since the bags are not collapsible, they are not readily withdrawn from the tire shoe after the latter has been vulcanized, and the sides of the shoe have to be pried apart to remove the bags. The removal of the latter immediately after the vulcanization is not conveniently accomplished by hand for the parts are hot and otherwise inconvenient to handle. This results in the temptation for the workman to pull the air bag out by the valve stem which destroys the connection of the latter.

This invention has for its object to provide an improved air bag for the purpose described, having a device whereby it may be conveniently withdrawn from the shoe by pulling on the bag, as distinguished from prying on the shoe or pulling on the air valve as stated, and a means for connecting the device to the end of the bag so that the end closure thereof will not be weakened or punctured under the force exerted thereon in removing the bag.

Other objects and advantages will appear in the description to follow and will be particularly pointed out in the appended claims.

The invention, in an embodiment at present preferred, is shown for illustrative purposes in the accompanying drawings, in which—

Figure 1 is a fragmentary elevational view of a tire shoe showing the improved air bag therein;

Fig. 2 is a cross sectional view taken on the line 2—2 of Fig. 1; and

Fig. 3 is an enlarged fragmentary view of one end of the air bag with parts broken away to reveal interior construction.

Referring to these drawings in detail, the air bag consists of a hollow member 5 of substantially cylindrical form, one end of which is entirely closed. The other end of air bag 5 is also closed except for a flexible tube 6 in the end of which is a suitable air valve (not shown), such, for example, as that used on the inflation stems of tires. The air bag is made up of layers of fabric 7 and rubber 8, the whole being vulcanized in the usual manner. The bag 5 is made up in much the same manner as a tire shoe and is constructed to retain its shape in the same way as does a tire shoe, since it is built up of a plurality of layers of fabric with relatively thick walls. The bag is not collapsible like an inner tube but is purposely made relatively hard, strong, and sturdy on account of the use to which it is to be put.

The air bag is adapted to be placed within a tire shoe *a*, as illustrated in Fig. 1, to underlie a part of the shoe which is to be repaired. In making the repair, commonly a vulcanizing mold is fitted about the exterior part of the shoe, and the bag 5 is inflated to relatively high pressure through stem 6 to force the shoe against the mold parts. The air bag should thus be exteriorly shaped to fit the interior of the tire shoe *a*, and, although the bag is relatively short, it should nevertheless be curved, as shown in Fig. 1, from the center of the tire shoe.

The bag 5 is inserted through the space *b* (Fig. 2) of the tire shoe by spreading the sides of the latter apart, and after vulcanization of the shoe the bag is removed through space *b*. It will be obvious that the removal of bag 5, even when deflated, is relatively difficult, and the operation is all the more difficult when the shoe is hot at the end of the vulcanizing operation. The shoe is too hot to handle, and the bag cannot be readily and conveniently removed by spreading the sides of the latter apart, and to pull the bag out by hand results in burns and scraping off of the skin at the edges of the shoe. The only part projecting from the usual air bag is the valve stem 6 and, due to the described inconvenience of removing the bag, the temptation is for the operator to use the valve stem as a handle in removing the bag. The valve stem of a non-collapsible bag of the character described is obviously unfit for such service and when thus used is injured. The valve stem is not anchored to the bag in a sufficiently strong manner to permit its use as a handle.

To insure against the use of the valve stem as a handle, a more convenient and more temptingly arranged handle is provided which is firmly anchored to the bag, in such a manner that it may safely be used to pull the bag from the shoe. A ring 9 is embedded in one end of the bag during its manufacture and to the ring is attached a handle wire 10, the end of which is made in loop form as shown in Fig. 1. The wire 10 during the process of vulcanization may be positioned, as shown in Fig. 1, or in any other position as vertically above the air bag, and, after the vulcanizing operation, the looped end of wire 10 may be grasped by the hand and used as a means for pulling the air bag out of shoe a. Thus, the bag 5 may be readily removed without danger of burning the hands and without other inconveniences heretofore experienced.

The fact that the air bag is subjected to high pressure and the fact that it is difficult to remove even when deflated makes necessary a special means of embedding the ring 9 in the end of the air bag. For example, the ring must be so embedded that it is firmly anchored in place and cannot be displaced by the force exerted thereon to remove the bag from the tire shoe. The ring furthermore must be so inserted that it cannot cause leakage at the end of the bag, and the ends of the bag are generally more liable to leakage than other portions thereof.

To obtain a firm anchorage of ring 9 and an anchorage which will not weaken the end of the bag so as to cause leakage, the following construction is employed which embodies the particular feature of the invention. The bag as described is made up from a plurality of strips of fabric into the cross sectional shape shown in Fig. 2, and the length of the strips of fabric is made greater than the desired length of the air bag. The end closure for the bag is then obtained by bending the ends of the fabric inwardly from all sides of the bag. One end of a layer of fabric 7 is superimposed upon an end of another layer 7 in overlapping relation, as clearly shown in Fig. 2. By thus overlapping the ends of the rubberized fabric layers, the end of the air bag is increased in thickness over the side walls of the bag. With the end walls of the bag of greatly increased thickness, all of the fabric is not needed to resist leakage under air pressure and the outer overlapped fabric ends may be utilized as an attaching means for ring 9. The latter is looped through the overlapped outer layers, as shown in Fig. 3, and rubber having been previously applied to the fabric in the usual manner the bag is vulcanized.

By thus embedding ring 9 a firm anchorage is obtained. The strain applied to the ring comes entirely upon the outer layers of fabric, and the inner overlapped ends cannot, therefore, be weakened by the pull on ring 9. Even if the latter should be pulled free from the bag, there would still be ample fabric left to resist the air pressure and repairs could readily be made. The overlapped ends of the fabric layers being held together by ring 9 cannot come apart unless sufficient force is exerted on the ring to rip through the fabric.

Thus, I have provided an economical and efficient air bag having means whereby it may readily be removed from a tire and a connection between the end of the bag and said means, whereby the bag may be subjected to the strain of said means without weakening the end closure of the bag and causing leakage.

The invention has been described in a preferred form for illustrative purposes, but the scope of the invention is defined by the appended claims rather than by the foregoing description.

What I claim is—

1. The combination in a device of the class described of a non-collapsible bag adapted to be positioned within a tire shoe and inflated to exert pressure internally on the latter during a vulcanizing operation, a ring anchored in one end of said bag and a flexible handle attached to said ring so that it may be positioned within the tire shoe during said operation and may be subsequently used to remove the bag from the tire.

2. An inflatable air bag for tire shoes, comprising, a hollow substantially cylindrical member having closed ends and formed of rubber and strips of fabric, the ends of the strips being inwardly turned and superposed one on the other in overlapping relation to form an end closure for the member of greater thickness than the other walls thereof, and a flexible handle attached to one end of the member, said handle having a part looped through the overlapped ends of certain of the outer fabric layers leaving other layers between it and the interior of the bag, all constructed and arranged so that the latter may be withdrawn from a tire shoe by said handle and so that the strain exerted by the latter on the end closure is prevented from causing leakage therethrough when the bag is inflated.

3. An air bag for use as a vulcanizing tool for tire casings, comprising, a non-collapsible cylindrical member closed at both ends and made up of fabric layers and rubber, a valve stem connected through one end and means fastened intermediate the fabric layers of the cylindrical member by which the latter may be conveniently removed from an open-bellied casing.

FRANK J. FOOTE.